United States Patent [19]

Anderson

[11] Patent Number: 5,220,452
[45] Date of Patent: Jun. 15, 1993

[54] VOLUME DISPLAY OPTICAL SYSTEM AND METHOD

[75] Inventor: Douglas W. Anderson, Richardson, Tex.

[73] Assignee: Texas Instruments Incorporated, Dallas, Tex.

[21] Appl. No.: 742,563

[22] Filed: Aug. 7, 1991

Related U.S. Application Data

[63] Continuation of Ser. No. 563,370, Aug. 6, 1990, abandoned.

[51] Int. Cl.⁵ .................. G02B 27/22; G02B 26/10; G02B 27/20
[52] U.S. Cl. .................. 359/462; 359/478; 358/88; 340/724
[58] Field of Search ......... 350/358, 174, 6.1, 6.5, 350/481, 442, 443, 574, 130, 144; 358/88, 3, 63; 340/724, 727

[56] References Cited

U.S. PATENT DOCUMENTS

| | | |
|---|---|---|
| Re. 29,670 | 6/1978 | Spaulding ............... 350/358 |
| 1,223,459 | 4/1917 | Whitney . |
| 1,794,103 | 2/1931 | Cubitt . |
| 2,589,569 | 3/1952 | Peter et al. . |
| 3,471,641 | 10/1969 | Baker et al. . |
| 3,524,011 | 8/1970 | Korpel ................. 350/358 |
| 3,544,806 | 12/1970 | De Maria et al. ....... 350/358 |
| 3,549,800 | 12/1970 | Baker . |
| 3,682,553 | 8/1972 | Kapany ................. 358/88 |
| 3,757,106 | 9/1973 | Bau et al. . |
| 3,825,335 | 7/1974 | Reynolds . |
| 3,825,336 | 7/1974 | Reynolds . |
| 3,956,833 | 5/1976 | Chase .................. 358/89 |
| 3,970,361 | 7/1976 | Di Matteo et al. . |
| 4,042,909 | 8/1977 | Garcia et al. .......... 358/88 |
| 4,053,898 | 11/1977 | Hirayama et al. ....... 350/358 |
| 4,084,182 | 4/1978 | Maiman ................. 350/358 |
| 4,130,832 | 12/1978 | Sher . |
| 4,535,394 | 8/1985 | Dugre . |
| 4,541,712 | 9/1985 | Whitney ............... 350/358 |
| 4,613,201 | 9/1986 | Shortle et al. ........ 350/6.1 |
| 4,623,219 | 11/1986 | Trias ................. 350/132 |
| 4,833,528 | 5/1989 | Kobayashi ............. 358/53 |
| 4,870,485 | 9/1989 | Downing et al. ........ 358/88 |
| 4,871,231 | 10/1989 | Garcia ................ 350/144 |
| 4,881,068 | 11/1989 | Korevaar et al. ....... 340/766 |
| 4,896,150 | 1/1990 | Brotz ................. 358/88 |
| 4,922,336 | 5/1990 | Morton ................ 358/88 |
| 4,952,034 | 8/1990 | Azusawa et al. ........ 350/6.5 |
| 4,978,202 | 12/1990 | Yang .................. 350/331 R |

FOREIGN PATENT DOCUMENTS

| | | | |
|---|---|---|---|
| WO8501175 | 3/1985 | European Pat. Off. ... | 350/358 |
| 128524 | 7/1984 | Japan ................. | 350/358 |
| 257695 | 12/1985 | Japan ................. | 358/88 |

OTHER PUBLICATIONS

07/409,167 Garcia, Jr. Real Time Three Dimensional Display and Method.
L. C. Foster et al., "A High-Resolution . . . ", *Appl. Opt.*, vol. 9, No. 9, Sep. 1970, pp. 2154-2160.

*Primary Examiner*—Jon W. Henry
*Attorney, Agent, or Firm*—L. Joy Griebenow; William E. Hiller; Richard L. Donaldson

[57] ABSTRACT

There is disclosed a method and system for controlling the optics of a coherent light source impacting a three dimensional defined volume. The system uses a scanner to time and spatially position the coherent light. The divergent light beam output of the scanner is then placed through positive and negative lenses to narrow the beam waist while also increasing the divergence angle of the beam. Provision is made to abate the divergence angle so that the light, as it impacts the defined volume, will not continue to diverge, creating a skewed image within the volume.

12 Claims, 4 Drawing Sheets

VOLUME DISPLAY OPTICAL SYSTEM AND METHOD

This application is a continuation of Ser. No. 563,370, filed Aug. 6, 1990, now abandoned.

TECHNICAL FIELD OF THE INVENTION

This invention relates to volume displays and more particularly to an optic light ray system and method for controlling the generation of light images within a defined volume.

This application is a continuation of application Ser. No. 07/563,370, filed Aug. 6, 1990 now abandoned.

RELATED APPLICATIONS

All of the following patent applications are cross-referenced to one another, and all have been assigned to Texas Instruments Incorporated. These applications have been concurrently filed and are hereby incorporated in this patent application by reference.

U.S. patent application Ser. No. 07/563,180 filed Aug. 6, 1990 and entitled "A System and Method for Support and Rotation of an Object".

U.S. patent application Ser. No. 07/563,238 filed Aug. 6, 1990 and entitled "Linear Stepper Motor Design and Method of Operation".

U.S. patent application Ser. No. 07/563,372 filed Aug. 6, 1990 and entitled "Apparatus and Method for Volume Graphics Display".

U.S. patent application Ser. No. 07/563,374 filed Aug. 6, 1990 and entitled "Volume Display Development System".

BACKGROUND OF THE INVENTION

A relatively new display system has been developed which generates images in all three physical dimensions. The system relies on the generation within a confined space, typically, a closed dome, of a volume upon which coherent light impacts to create the images. Each image is comprised of a number of light pixels (called voxels) usually generated by one or more laser beams impacting on the generated volume within the dome.

The defined volume can be created by spinning a helix shaped surface (disk) within the dome so that as the disk spins a volume is created defined by the disk surface as it moves up and down in a helical curve. Thus, at any point in time a different height of the volume is at a given physical location within the dome. A light spot can then be created by impacting a beam of coherent light with the disk at a particular point in time coinciding with the height desired for that point of light. By timing a large number of such light beams, three dimensional objects can be created within the dome and these objects then can be viewed from any position since the spinning disk (which creates the display volume) is essentially transparent to the eye. Such a system is the subject of U.S. patent application, Ser. No. 07/409,176.

One critical aspect of such a system is the very fast processing and generation of the light points which are distributed in space and time and which must be very precisely timed and spatially positioned if the resulting image is to be free of jitter. Thus, it is necessary to generate signals representative of the light points that are desired on a continuing basis and then to direct the laser light beams to those points at precisely the right physical location and at the precisely the right time.

A further requirement of such a system is that different light colors are required and these must all be positioned to impact at the same precise point.

One goal of such a system is to generate images from known x,y,z data and then once the images are generated, to actually display them in the created volume. This presents several optical challenges in the design of the system. Some of these problems include the coverage of the entire volume, the trade-off between resolution and speed, and how many points to display and with what resolution. Some of these trade-offs stem from how quickly a signal can be switched from one point to another within the volume versus how small the point can be focused.

The optical problem begins with the fact that the scanner has a very limited output divergent angle and thus, it is important to amplify that divergence to fill up the display volume optically. However, when that angle is diverged, the width of the laser beam is also diverged. The divergence reduces the resolution of the beam.

A set of signals must be generated to drive the acousto-optics at the proper time. The image that is produced is critically dependent on that timing and on the spatial positioning of the modulated coherent light beam. In order to achieve a 3-dimensional image, beams may be intercepted by the helical screen at any depth in the volume. This requires the beams to maintain a small diameter throughout the path length inside the volume display in contrast to typical laser printers or projectors where a small focus is achieved only in a single plane.

Thus, there exists in the art a need for an optic system that works at extremely high speeds and that can both spatially and temporally control the positioning of coherent light beams.

A further need exists in the art for such a system and method which allows for different colors of light and which allows for each light color to be positioned in exactly the same physical space.

A still further need exists in the art for such a system which allows for easy adjustment for different created volumes and which can handle different disk shapes.

SUMMARY OF THE INVENTION

The problems of presenting three dimensional images have been solved by partitioning the system into real time and non-real time components. This invention deals with the real time elements as well as the optics which support the operation. The system uses a processor which then drives the display. The processor in one embodiment is a dedicated device that accepts display lists of information and generates commands that drive a scanner. The scanner then generates the deflection of the laser beam in real time to create the image in the created volume.

The problem of diverging the individual light beams while maintaining focus resolution is solved by placing a positive lens close to the scanner output to converge the laser beam width so that is has a very small waist. Then a negative lens is used to amplify the divergence created by the scanner. This lens is designed to have very little effect on the laser beam diameter because the waist is small as the beam passes through the negative lens.

The laser beams will continue to diverge with respect to each other after passing through the negative power lens. Thus, when they impact the volume at different depths, the size of the image will be different depending upon the volume distance from the lens at the point of impact. To prevent distortion of the resulting image, another optical element is used in order to collect the diverging light beams and make them go through the volume parallel to each other.

In one embodiment, a mirror is used. However, any other type of refracting or diffracting element that gives the same power can be used.

An additional problem that was solved is the multicolor problem which is a matter of taking separate systems, one for each color, and combining them so that they all strike the volume in the right locations. Three separate lasers are used (for 3 colors) having a separate scanner for each color. Before the beam is diverged, the colors are mixed for presentation to the negative lens.

Accordingly, it is one technical advantage of this invention to provide an optical system that can accept signals representative of the time and spatial orientation of a plurality of coherent light spots in a defined volume and to convert those signals into spatially separated, narrowly focused, coherent light beams. At their point of impact, these beams must be parallel to one another.

It is a still further technical advantage to construct such a system having multicolor presentation, with each color having the capability of presentation at the same spatial position within the defined volume.

It is a still further technical advantage of this invention to provide a system for presenting three dimensional images by the use of modulated coherent light where the light is separated into time and space coordinates and where the individual beams are narrowly focused while the interbeam angles are diverging over a wide area prior to contact with a defined volume. The system also allows for the divergence to cease prior to impact with the defined volume so that images formed in the defined volume are not skewed due to the continued divergence between light beams which impact the volume at one distance from the source and light beams which impact the volume at a different distance from the source.

BRIEF DESCRIPTION OF THE DRAWINGS

The foregoing objects, features and technical advantages, as well as others, of the invention will be more apparent from the following description of the drawings in which.

DETAILED DESCRIPTION OF THE INVENTION

Figure 4:
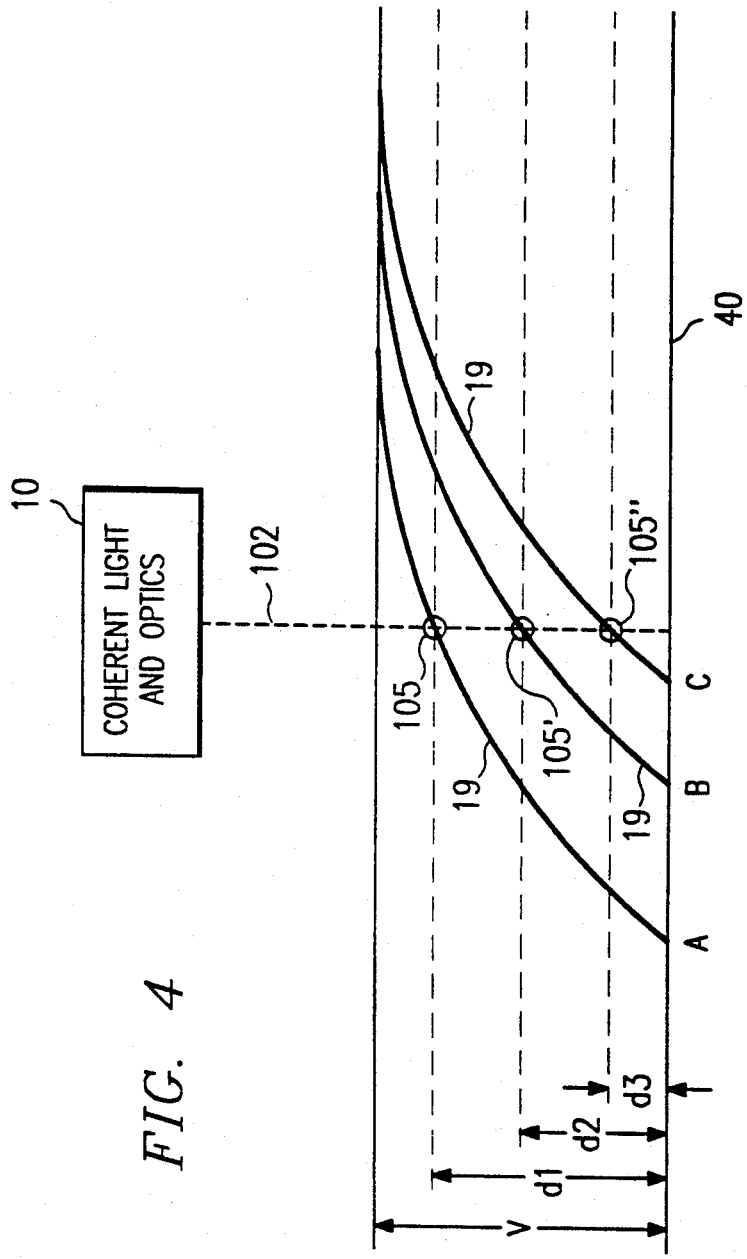
FIG. 4 shows a defined volume time displaced sequence.

Before beginning a discussion of the optic system, a brief overview of the manner in which images are created in a defined volume is appropriate. Such a discussion is with respect to FIG. 4 where surface 19, which in one embodiment can be a spinning helix, defines a volume V as it rotates about some central point. Each point in time A, B and C shows the same physical (spatial) place but at a slightly different time. Hence, the surface 19 representing the surface of the helix moves with respect to the fixed reference frame of FIG. 4 as time progresses from A to B to C. Since the helix, or double helix in another embodiment, is spinning at a rate of 600 rpm or faster, the human eye will treat the surface as being transparent. It is this transparency, coupled with the fact that the coherent light, upon impact with the surface, will generate a spot of light which is visible to the human eye, which allows for the creation of three-dimensional images.

Thus, coherent light source and optics system 10, which will be discussed in more detail in that which is to follow, provides a pulse of light 102 which has been spatially positioned and timed such that it impacts with surface 19 to form a point of light 105 at a height d1 from a base line 40. This pulse could be timed to arrive a little later in time and then it would impact surface 19 to create point of light 105' which is displaced from base line 40 at a height of d2. Still further delay in the beam 102 would result in a point of light 105" at a height of d3 from base line 40.

Using this technique, then, and understanding that light source 10 can deliver multiple light beams over a wide spatial range sequentially in time, three dimensional images can be formed from the points of light. Because the spinning helix is transparent to the human eye, the light spots will appear to be free floating and can be viewed from any angle and from any side.

The optical problem begins with the fact that the scanner has a very limited output divergent angle and thus, it is important to amplify that divergence in order to fill up the display volume optically. However, when that angle is diverged, the width of the laser beam is also diverged which, in turn, reduces the resolution. Contrary to other well known lens systems for use in projecting images on the screen which constitute a single focal plane, the instant system produces a three dimensional image on the rotating helix which is, in one way of thinking, a multiple or varying focal plane. Thus, the problem with projecting the beam across the display volume is that the beam must have as little divergence as possible so that it will be focused upon engaging the focal plane at any depth through the display volume. Such focus must be maintained despite the fact that it is necessary to amplify the divergence of the output from the scanner in order to fill the X-Y axis of the volume display.

Figure 1:
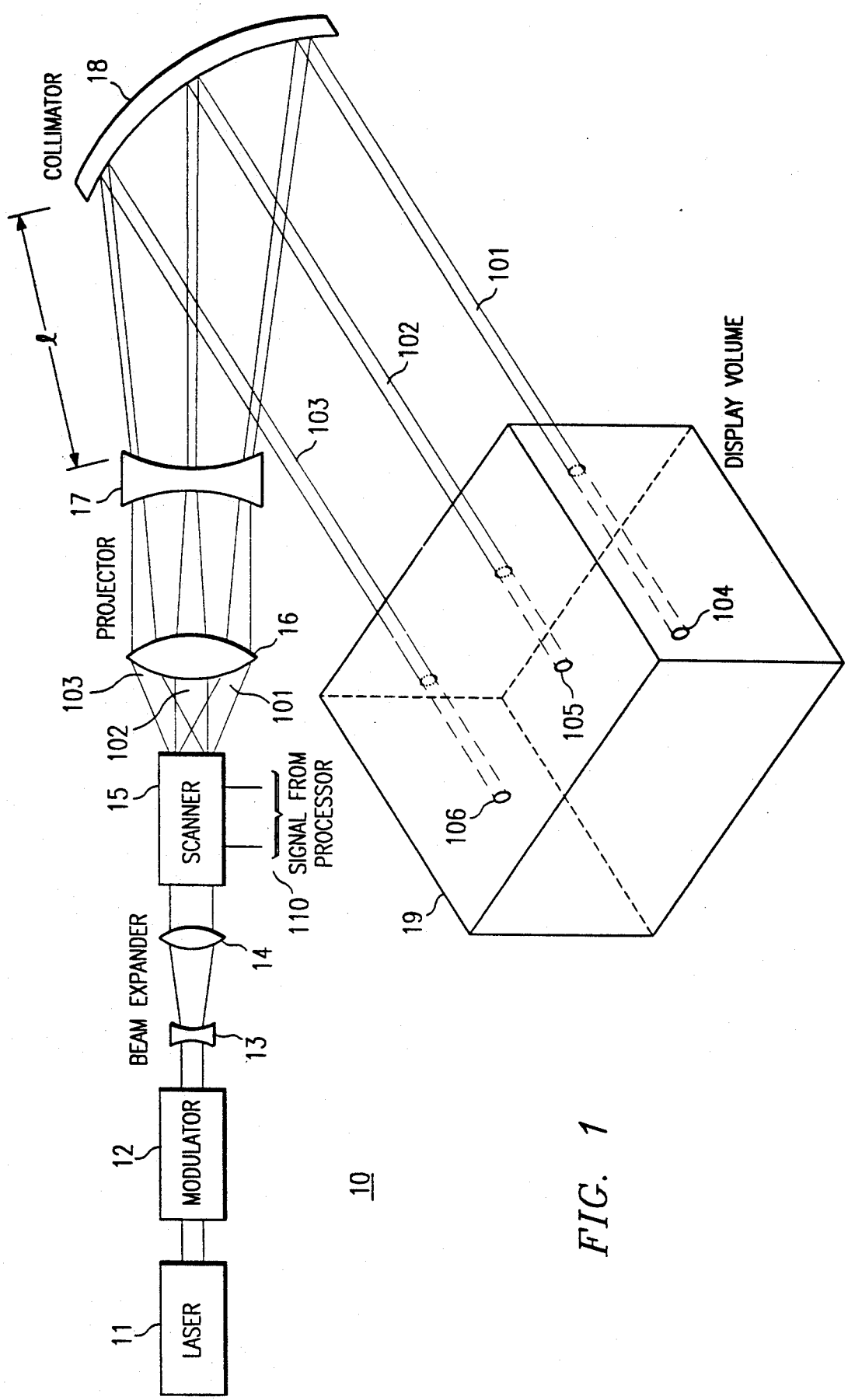
FIG. 1 shows the optical system for a single coherent beam.

Turning now to FIG. 1, optics system 10 includes the light source which can be a visible light laser 11, typically an argon laser. The laser beam enters modulator 12 that switches the laser beam on and off, synchronizing it with other elements of the system and with the spinning disk. Lenses 13 and 14 comprise a beam expander that increases the diameter of the laser beam as an input to scanner 15. The diameter of the beam is the result of the trade-off between system speed and resolution. The specific beam expander magnification required is dependent on the characteristics of the scanner and the nature of the information to be displayed. The tradeoff between display luminance, spot size or resolution, and system speed or number of displayable voxels, as embodied in the beam expander is a critical element of this invention.

Scanner 15 is an off the shelf dual access acousto-optic laser scanner such as model LS110-XY from Isomet Corporation. Within the scanner, two orthogonally mounted single axis deflectors sequentially deflect the beam so that any position in X-Y angular space may be addressed. By projecting the resulting angles onto a screen such as the helix described above, these scanned angles are mapped into X-Y displacements in the display volume. The scale factor of the mapping is determined by the design of the projection optics. Since the scanner addresses only one position at a time, the image must be built point by point sequentially in time. Because the helical projection screen is moving, the signals directing the scanner must be scheduled so as to direct each point at the proper time with respect to the screen motion to create the three dimensional image. An electrical signal 110 from a signal processor (not shown) controls scanner 15. It is the subject of concurrently filed patent application Apparatus and Method for Volume Graphics Display Ser. No. 07/563,372 filed Aug. 6, 1990. The diameter of the beam is the result of the trade off between speed and resolution. The speed of the acousto-optic scanner relates to the time required to display a single point of light. This depends on the acoustic velocity of the active acousto-optic medium and on the diameter of the light beam at the scanner. A larger beam diameter will require a longer display time than a small beam diameter given the same acoustic velocity. Similarly, the resolution of the scanner relates to the action of the scanner as a diffracting aperture. A small beam diameter will result in a larger beam divergence and a lower resolution system. As a result, a small beam at the scanner gives a lower resolution system, but with more displayable points as a result of the increased scanner speed when compared to a system with a larger beam diameter at the scanner. The output of the scanner comprises several beams sequential in time that diverge with respect to each other. They are incident on lenses 16 and 17 that comprise a projector. Lenses 16 and 17 individually narrow beams 101, 102, and 103 and, at the same time, increase the divergence of the beams from one another.

Collimator 18 then eliminates the divergence angle after the three beams have achieved the proper separation. The beams are incident on the spinning disk in the display volume and become images 104, 105 and 106. Beams 101, 102 and 103 are able to impact any depth within the display volume by properly synchronizing with the spinning disk.

Figure 2:
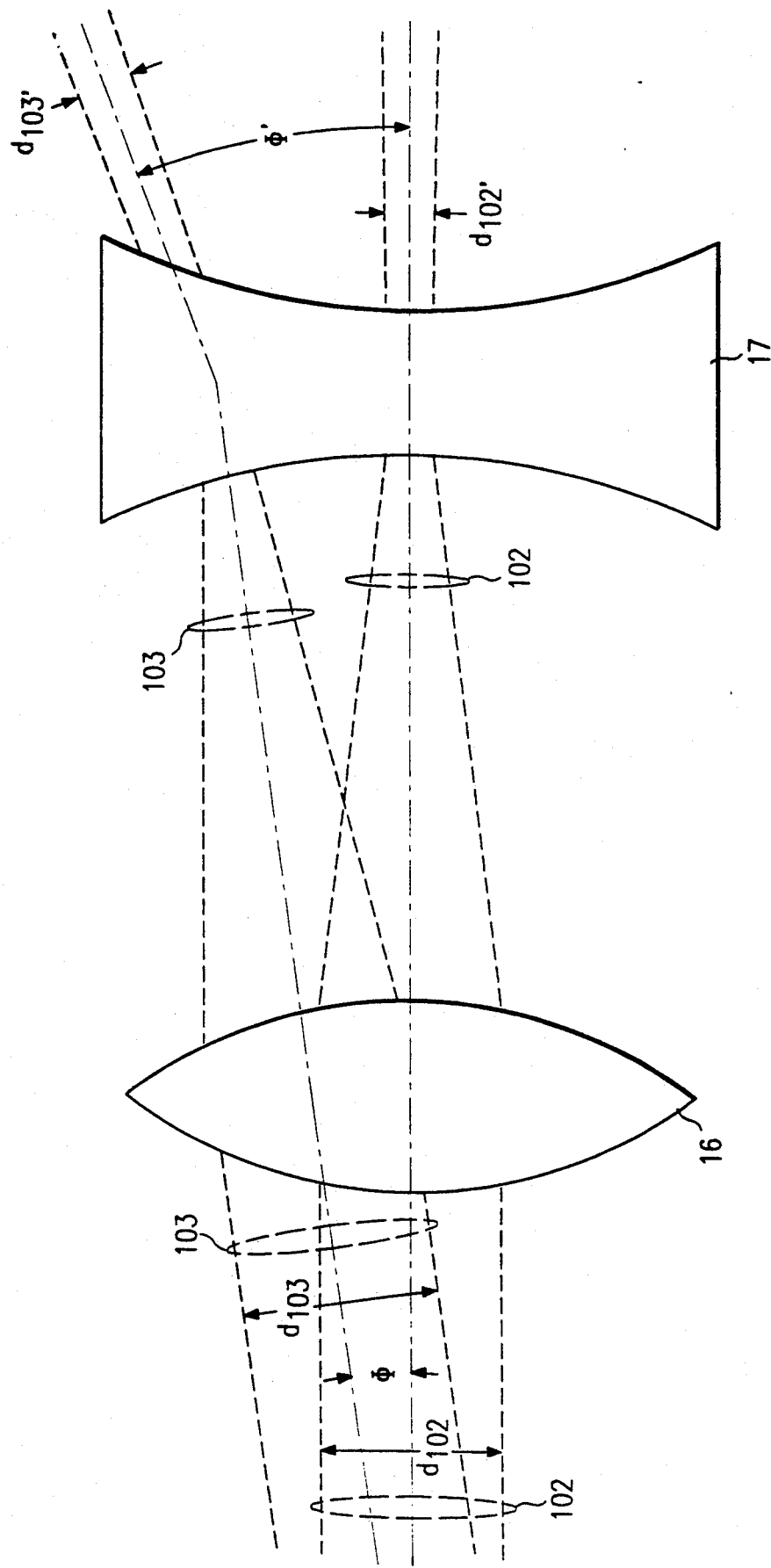
FIG. 2 shows the beams passing through positive and negative lenses.

FIG. 2 more fully illustrates projector lenses 16 and 17. Beams 102 and 103 are incident on positive lens 16. The projector (lenses 16 and 17) decreases the diameter (d-102, d-103) of the beams, when they exit the projector as d-102' and d-103'. The projector also increases the angle from $\phi$ to $\phi'$ between beams 102 and 103 at the exit path. Lens 16 has little affect on angle $\phi$. Lens 16 acts much like an objective lens which to first order focuses the individual beams without changing the field angle. Negative power element 17 increases angle $\phi'$ and has little effect on the diameters of beams 102 and 103, acting much like a field lens which to first order does not refocus the individual beams but does change the field angle. While this describes the first order properties of the elements 16 and 17, detailed consideration of the beam propagation and geometric aberration effects are required to determine the constructional parameters for any specific embodiment.

Returning to FIG. 1, as diverging beams 101, 102, and 103 leave negative lens 17, they continue to diverge. Therefore, if the display volume were to be placed in the beam path directly after lens 17, the image formed on different sides of the display volume would have different lengths and thus be distorted. This problem has been solved by using collimator 18 that stops the divergence after length 1 and makes the beams 101, 102, 103 parallel to each other. Length 1 can be adjusted, not shown, to change the divergence angle.

While collimator 18 has been shown as a curved mirror surface, it could be any one of several different arrangements. For example, collimator 18 could be a large refractive element, a Fresnel optic, or a holographic optic.

Figure 3:
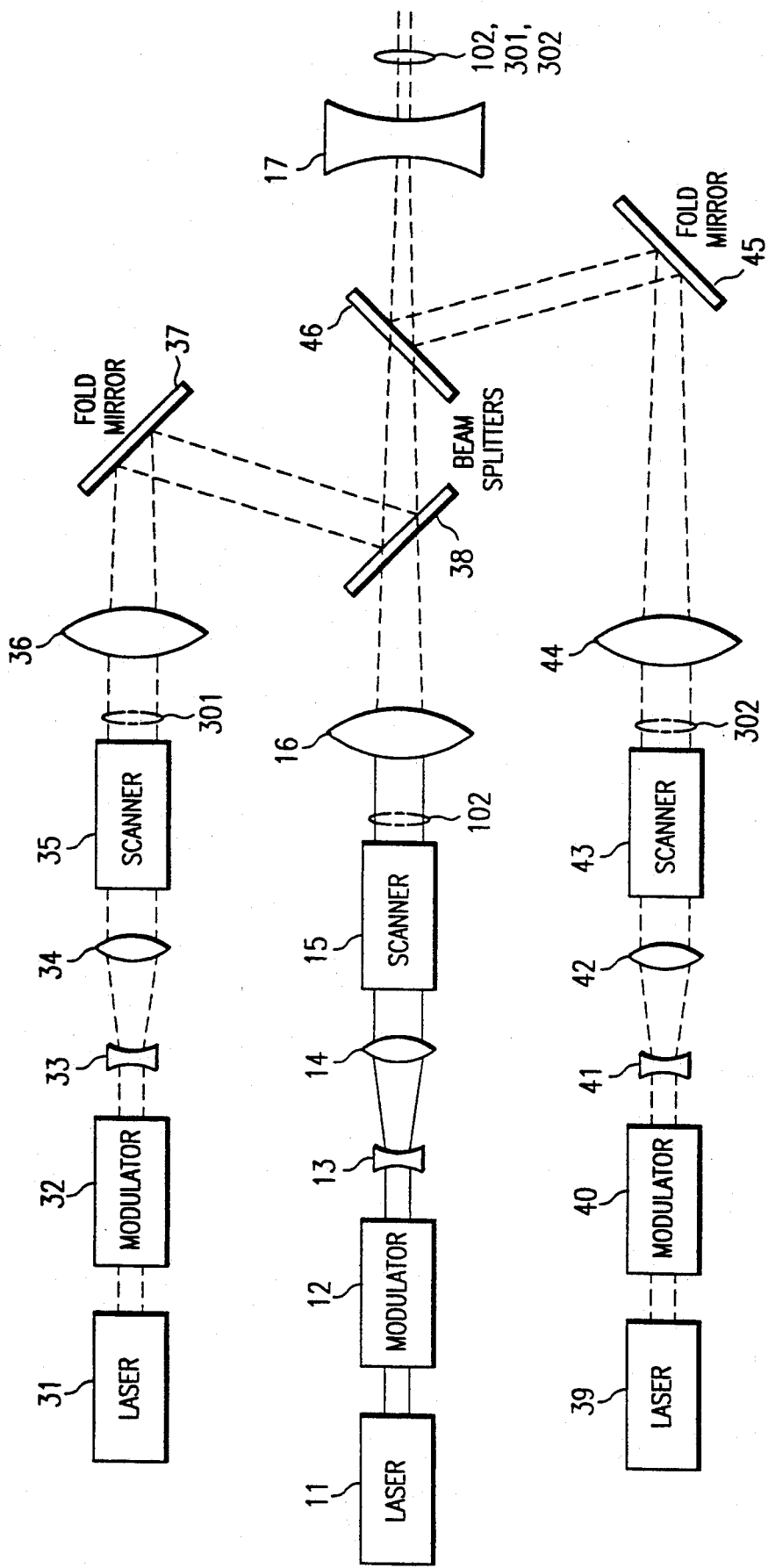
FIG. 3 shows a multiple beam system.

Turning now to FIG. 3, a three color or multicolor system is shown. The second and third color beams 301 and 302, respectively, each have their own laser beam modulator 32, 40, beam expander 33, 34 and 41, 42, scanner 35, 43 and are folded by a mirror 37, 45 from their own path into the path of the first color between lenses 16 and 17. The beam splitters 38, 46 that are located between lenses 16 and 17 are standard dichroic type beam splitters. The output of the light path from lens 17 can be any single beam 102, 301 or 302 or any combination 102, 301 and 302; 102 and 301; 102 and 302; or 301 and 302 thereof.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. An optics system for use in creating images from coherent light in a defined volume display, said system comprising:
   a coherent light source;
   a scanner for spatially displacing individual beams of said coherent light;
   a first lens for compacting the beam width of each such spatially displaced light beam;
   a second lens for amplifying the spatial displacement of each such spatially displaced light beam without changing said compacted beam width; and
   a spinning disk defining a display volume, said spinning disk intersecting said light beam at different depths in the display volume for producing a three dimensional image.

2. The system as set forth in claim 1 wherein said system further comprises:
   a collimator for accepting said spatially displaced light beams and for converting said light bursts into parallel light beams.

3. The system set forth in claim 1 wherein said system further comprises:
   a collimator for modifying said displacement angle of said diverging light beams.

4. A system for presenting coherent light beams to a defined volume, such that the presented beams will impact the volume at different distances from the light source to form a three dimensional image within the defined volume, said system comprising:
   a scanner for spatially displacing individual beams of coherent light, each beam having a particular time and spatial orientation, said spatial orientation measured as a divergence angle from a center line;
   a first positive lens for creating a narrow waist with respect to each light beam emerging from said scanner;
   a second negative lens for increasing each divergence angle while still maintaining each said narrow waist; and
   a spinning disk defining a display volume, said spinning disk intersecting said light beams at different depths in the display volume for producing a three dimensional image.

5. The system set forth in claim 4 further comprising:
a light beam divergence angle modifier for changing the angle of said divergence angle.

6. The system set forth in claim 4 wherein said system further includes:
a processor for generating a plurality of signals each for controlling the depth of a light beam with said disk as well as the spatial positioning of said light beams and wherein said signals control said scanner.

7. The method of operating an optic system for creating images from coherent light in a display volume defined by a spinning disk, said method comprising the steps of:
accepting coherent light beams;
spatially displacing individual light beams of said coherent light;
compacting the beam width of each such spatially displaced light beam;
amplifying the displacement angle of each such spatially displaced light beam without changing said compacted beam width; and
projecting each said light beam, which has had the beam width compacted, into said display volume, intersected by the spinning disk, and forming a three dimensional image.

8. The method set forth in claim 7 wherein said method further comprises:
accepting said spatially displaced light beams and converting said light beams into parallel light bursts for introduction in said defined display volume.

9. A method for creating coherent light spots within a well-defined display volume to form a three dimensional image within the defined display volume, said method comprising the steps of:
spatially displacing individual beams of coherent light, each having a particular time and spatial orientation, said spatial orientation measured as a divergence angle from a center line;
creating a narrow waist with respect to each said displaced light beam;
increasing each divergence angle while still maintaining each said narrow waist; and
projecting said displaced light beams, with narrow waists, into said display volume, said light beams traveling varying distances before impacting a moving surface within said display volume.

10. The method set forth in claim 9 further comprising the step of:
changing said divergence angle of each said light beam.

11. The method set forth in claim 10 wherein said divergence angle is changed a different amount for each said displaced light beam.

12. The method set forth in claim 10 further comprising the step of:
controlling the magnitude of the total divergence of all said displaced light beams.

* * * * *